United States Patent [19]

Rees et al.

[11] 4,088,401

[45] May 9, 1978

[54] OPTICAL SYSTEM FOR ALTERNATIVELY PROJECTING ADJACENT IMAGES OF ADJACENT OBJECTS OR DOUBLE IMAGES OF A SINGLE OBJECT

[75] Inventors: James D. Rees, Pittsford; Kent W. Hemphill, Rochester, both of N.Y.

[73] Assignee: Xerox Corporation, Stamford, Conn.

[21] Appl. No.: 756,582

[22] Filed: Jan. 3, 1977

[51] Int. Cl.² .......................................... G03B 21/00
[52] U.S. Cl. ............................ 353/122; 353/89; 355/46
[58] Field of Search ............. 355/46, 54; 353/122, 353/88, 89, 91, 82, 65, 66, 67, 30, 34

[56] References Cited

U.S. PATENT DOCUMENTS

| 2,496,272 | 2/1950 | Current | 355/46 |
| 2,557,685 | 6/1951 | Rabinowitz et al. | 355/46 |
| 2,740,324 | 4/1956 | Cahill | 355/46 |

FOREIGN PATENT DOCUMENTS

| 397,215 | 8/1933 | United Kingdom | 353/122 |

*Primary Examiner*—Richard E. Aegerter
*Assistant Examiner*—John W. Shepperd

[57] ABSTRACT

An optical system is disclosed for substantially doubling the capacity of a photocopying apparatus or the like. It provides alternative modes of operation; adjacent imaging of adjacent objects or double imaging of a single object. In the adjacent imaging mode, a single projection lens projects adjacent images of two adjacent objects in a straightforward way. In the alternative double imaging mode, a pair of projection lenses projects twin images of a single object along "parallel" optical paths.

6 Claims, 6 Drawing Figures

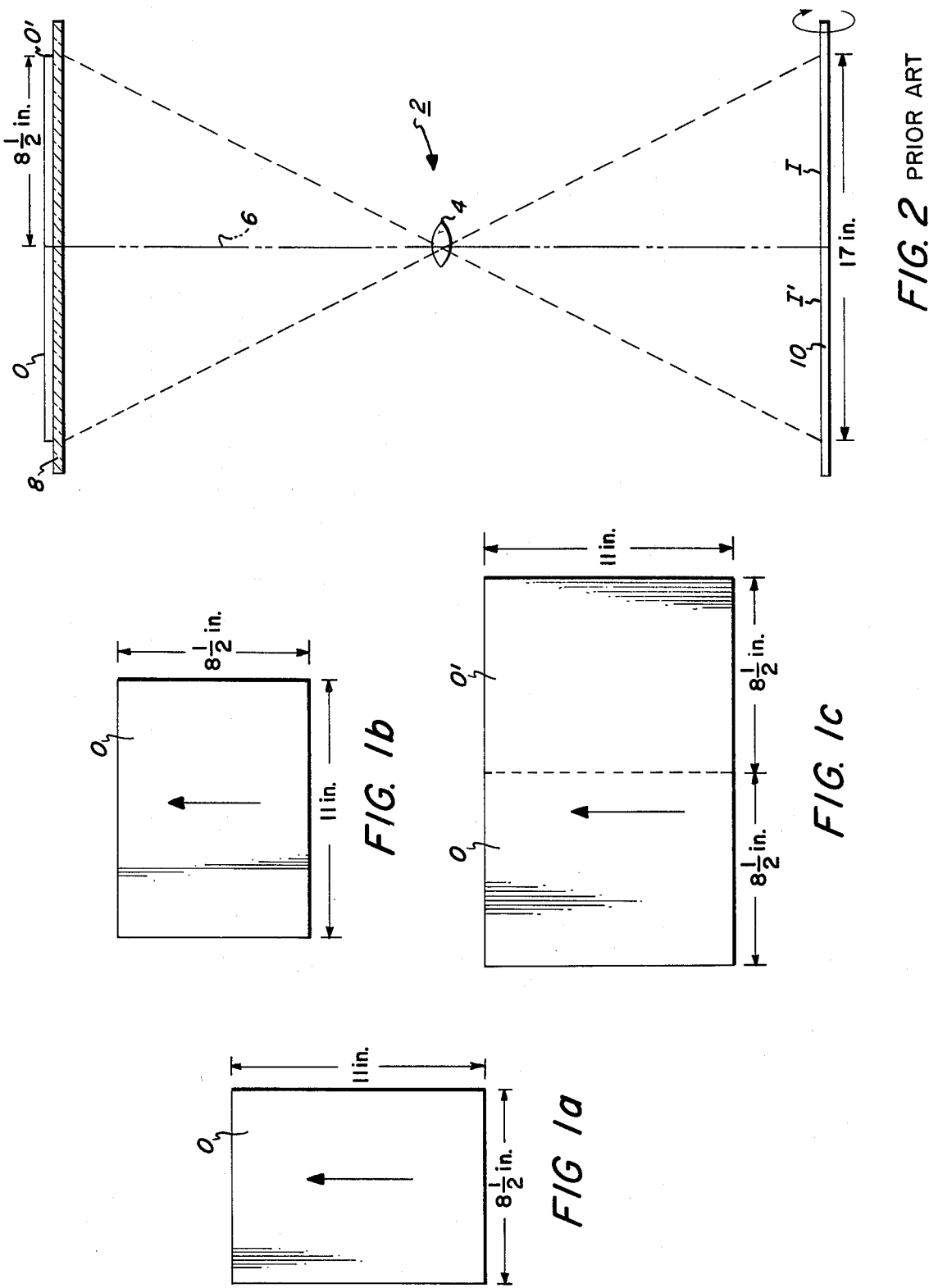

OPTICAL SYSTEM FOR ALTERNATIVELY PROJECTING ADJACENT IMAGES OF ADJACENT OBJECTS OR DOUBLE IMAGES OF A SINGLE OBJECT

BACKGROUND OF THE INVENTION

This invention relates to photocopying optical systems, and more particularly to an optical system for substantially doubling the capacity of a photocopying apparatus.

By way of background, it is generally desirable to maximize the capacity or machine throughput of a photocopying apparatus for any given process speed. Heretofore, this has been accomplished in copiers and duplicators by processing in the "landscape" rather than "portrait" mode. In a scanning environment, this refers to scanning of the original object from one long edge to the other, the scan travel being therefore along the short dimension. Correspondingly, the image is laid down on the photoreceptor and developed from one long edge to the other along the shorter edge dimension. It will be apparent that, for a given speed of photoreceptor, such an image is generated and developed faster than one which is scanned and laid down on the photoreceptor in the portrait mode, i.e., scanning in the longer direction from short edge to short edge.

From the foregoing step from portrait to landscape operation, a natural next step was to enlarge the size of the object station so as to accommodate an original object of, for example, 11 × 17 inches. This of course is equivalent to two adjacent 8½ × 11 inches sheets. Scanning and otherwise processing of an 11 × 17 inches original in the landscape mode then, becomes the equivalent of simultaneous processing of two adjacent 8½ × 11 inches originals in the portrait mode.

The several stages just described are illustrated in FIGS. 1a, 1b, and 1c. The progression may seem quite straightforward, simply providing more photoreceptor area and arranging the object in an optimum way to maximize its use. However, FIG. 1c also illustrates an inherent problem. That is, if the original object to be copied is not a "book" of several documents but a single original, then there is not only a zero gain in capacity or throughput in the apparatus but also an attendant waste of 50% of the copy paper, since a blank sheet will result from each scan of the blank part of the object area.

It is an object of this invention to provide a photocopying optical system which is capable of alternative modes of operation: to create adjacent images of adjacent objects or double images from a single object.

SUMMARY OF THE INVENTION

Briefly, the present invention is of an optical system for substantially doubling the capacity of a photocopying apparatus or the like. It provides alternative modes of operation; adjacent imaging of adjacent objects or double imaging of a single object. In the adjacent imaging mode, a single projection lens projects adjacent images of two adjacent objects in a straightforward way. In the alternative double imaging mode, a pair of projection lenses projects twin images of a single object along "parallel" optical paths.

DRAWING

FIG. 1 represents an original object in the 1a portrait, 1b landscape, and 1c adjacent portrait orientations for scanning and processing in a photocopying apparatus.

FIG. 2 is a schematic diagram of an optical system of the prior art used in connection with an object such as shown in FIG. 1c.

DESCRIPTION

Figure 4:
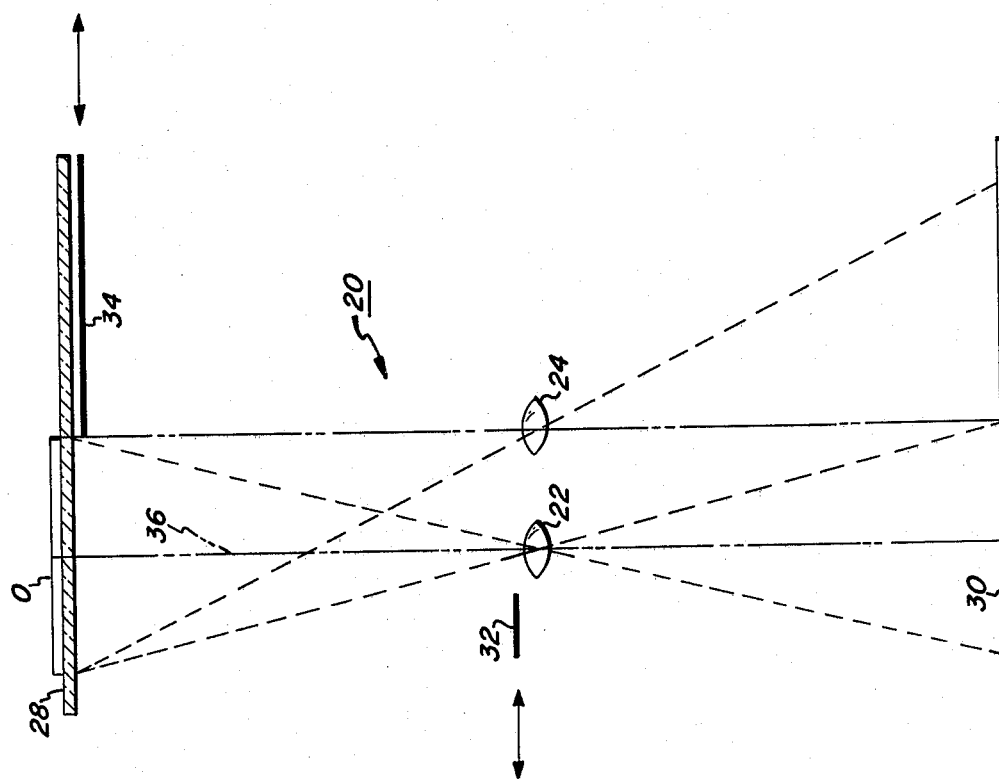
FIG. 4 is a schematic diagram of the same optical system of this invention shown in its other alternative mode of operation.

FIG. 1 represents at 1a an object or document O in a portrait position, at 1b a document O in a landscape position, and at 1c a pair of adjacent object documents O and O', individually in portrait positions but the side-by-side arrangement being the equivalent of a large object in a landscape position. The arrows in FIG. 1 represent the directions in which object O might be scanned in a scanning photocopying system.

FIG. 2 represents a photocopying optical system, generally indicated at 2 and including a projection lens 4 disposed on an optical axis 6 between conjugate object and image stations 8 and 10 respectively. A pair of documents O, O', as represented in FIG. 1c, is supported at the object station 8 for imaging at image station 10.

To aid in the description and understanding of this invention, object station 8 and image station 10 can be considered as planar, and may hereinafter be referred to as object plane 8 and image plane 10. In other words, the invention will be more easily described and understood in the context of a full-frame object-image system. However, it should be pointed out that the object station 8 might take the form of a curved platen in a strip scanning photocopying system. Furthermore, image station 10 might coincide with the surface of a rotating drum in a strip scanning system. In such nonplanar arrangments, objects O, O' would be oriented with the scanning arrow pointing into the drawing. Correspondingly, the image station or drum surface would be oriented on an axis extending across the drawing with the drum rotating toward or away from the reader as indicated by the curved arrow in FIG. 2.

Referring back to the planar conception of FIG. 2, it will be clear that the adjacent objects O, O' are imaged respectively as adjacent images I, I' at the image plane 10. As explained earlier, if a single object O is to be copied, it would be imaged at I and reproduced at that part of the image station 10 as many times as desired. However, in this circumstance, the O' – I' component of the optical system is wasted and, for as many copies as are to be made of object O, a corresponding number of wasted blank copy sheets passes through the I' portion of the image station 10.

The foregoing is all by way of background to the present invention which will now be described.

Figure 3:
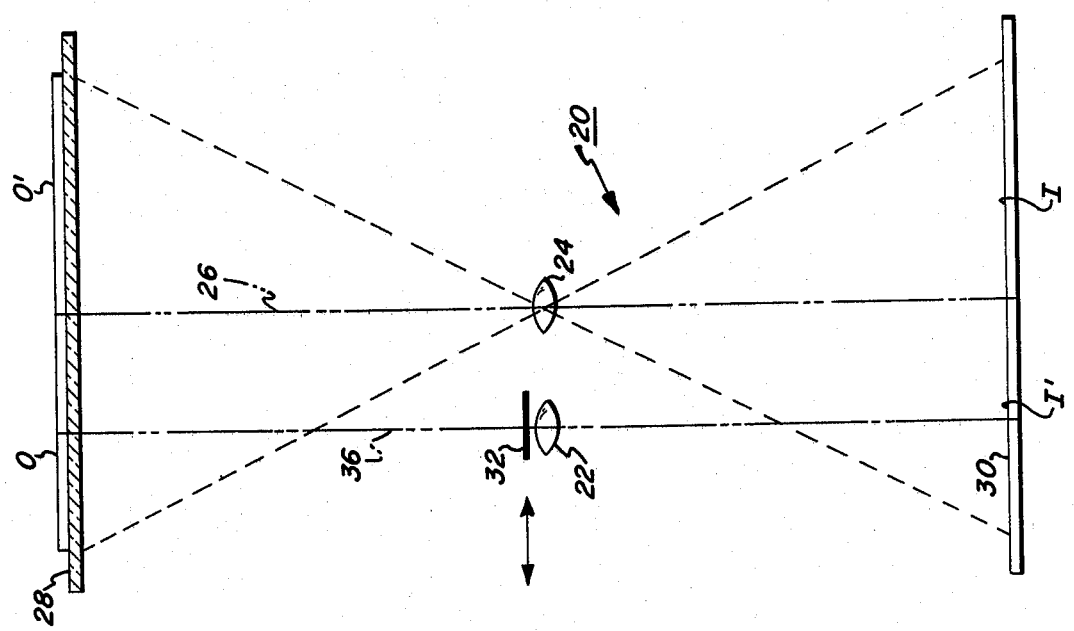
FIG. 3 is a schematic diagram of an optical system according to the present invention and shown in one of its alternative modes of operation.

Referring to FIG. 3, an optical system according to the present invention is indicated generally at 20. Optical system 20 includes a first projection lens 24 on a first optical axis 26 extending between conjugate object and image stations 28 and 30 respectively. A second projection lens 22 is disposed on a second optical axis 36, also extending between conjugate object and image planes 28 and 30. A shutter 32 is disposed adjacent to projection lens 22. In the FIG. 3 arrangement of this optical system, shutter 32 is represented as closed so that projection lens 22 is inoperative to project an image from object plane 28 to image plane 30.

In the arrangement of FIG. 3, the single projection lens 24 operates in the same manner as lens 4 in the earlier described optical system of FIG. 2 to project adjacent images of adjacent objects. Assuming the presence of a pair of object documents O and O', such as in FIG. 1c, the resulting projection is of adjacent images I and I' at the image plane 30 which might ultimately appear in "saddle" relationship on a single large support sheet. This "saddle" mode of operation of optical system 20 alludes to that term which in graphic arts generally refers to the arrangement of two pages of content folded in the middle. Images I and I' might also be placed on separate sheets of paper passing in parallel through the system. This is immaterial to this invention.

Referring now to FIG. 4, the same optical system 20 is shown in its alternative mode of operation for double imaging from a single object. In this configuration, shutter 32 is represented as open with respect to projection lens 22. An additional element shown in FIG. 4 is a field stop or mask 34 adjacent to the object station or platen 28 on the underside thereof so as to blank out, and black out, the corresponding portion of the platen 28. In this configuration, twin images of the single object O are projected along "parallel" optical paths by the two projection lenses 22 and 24. The term "parallel" is used here in its electrical sense to analogize the optical system of FIG. 4 to parallel electrical circuits. The optical axes 26 and 36 are not geometrically parallel.

The details of operation of the shutter 32 and field stop 34 are not material to this invention. The opening and closing of shutter 32 relative to the projecting lens 22 are represented simply by the arrow which schematically represents reciprocation of the shutter into and out of the path of light to the lens 22. Similarly, field stop 34 is schematically represented by an arrow as moveable into and out of masking relationship relative to the platen 28.

It will be appreciated from the foregoing description that an optical system has been provided for substantially doubling the capacity or throughput of a photocopying apparatus by the alternative modes of operation disclosed.

The foregoing description of an embodiment of this invention is given by way of illustration and not of limitation. The concept and scope of the invention are limited only by the following claims and equivalents thereof which may occur to others skilled in the art.

What is claimed is:

1. An optical system for alternatively projecting an image of a full object field in a first mode of operation and projecting a plurality of images of a partial object field in a second mode of operation, including:
    an object station defining an object field
    an image station defining an image field
    a first projection lens disposed on a first optical axis between said object and image stations;
    said object and image fields being respectively in object and image conjugate relationship to said first projection lens,
    a second projection lens disposed on a second optical axis between said object and image stations,
    a part of said object field and a first part of said image field being respectively in object and image conjugate relationship to said first projection lens,
    the same said part of said object field and a second part of said image field being respectively in object and image conjugate relationship to said second projection lens,
    a shutter operatively disposed relative to said second projection lens to close optical communication through said second projection lens in said first mode of operation and to open optical communication through said second projection lens in said second mode of operation, and
    a stop operatively disposed relative to said object station and movable between a clear position to permit unobstructed optical communication between said object station and said image station in said first mode of operation and a masking position to mask out part of said object field in said second mode of operation.

2. An optical system as defined in claim 1 in which said object and image fields are planar.

3. An optical system as defined in claim 1 in which said object field is incrementally scanned and imaged at said image field.

4. An optical system for alternatively projecting an image of a full object field in a first mode of operation and projecting a pair of images of a half of said object field in a second mode of operation, including:
    an object station defining an object field
    an image station defining an image field
    a first projection lens disposed on a first optical axis between said object and image stations;
    said object and image fields being respectively in object and image conjugate relationship to said first projection lens,
    a second projection lens disposed on a second optical axis between said object and image stations,
    a half of said object field and a first half of said image field being respectively in object and image conjugate relationship to said first projection lens,
    the same said half of said object field and a second half of said image field being respectively in object and image conjugate relationship to said second projection lens,
    a shutter operatively disposed relative to said second projection lens to close optical communication through said second projection lens in said first mode of operation and to open optical communication through said second projection lens in said second mode of operation, and
    a stop operatively disposed relative to said object station and movable between a clear position to permit unobstructed optical communication between said object station and said image station in said first mode of operation and a masking position to mask out half of said object field in said second mode of operation.

5. An optical system as defined in claim 4 in which said object and image fields are planar.

6. An optical system as defined in claim 4 in which said object field is incrementally scanned and imaged at said image field.

* * * * *